United States Patent
Nakamura et al.

(10) Patent No.: US 9,501,054 B2
(45) Date of Patent: Nov. 22, 2016

(54) MOTOR CONTROL SYSTEM COMPENSATING INTERFERENCE BETWEEN AXES

(71) Applicant: FANUC CORPORATION, Yamanashi (JP)

(72) Inventors: Tsutomu Nakamura, Yamanashi (JP); Satoshi Ikai, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/837,244

(22) Filed: Aug. 27, 2015

(65) Prior Publication Data
US 2016/0062325 A1  Mar. 3, 2016

(30) Foreign Application Priority Data

Sep. 1, 2014 (JP) .................................. 2014-177464

(51) Int. Cl.
*G05B 11/32* (2006.01)
*G05B 19/404* (2006.01)
*G05B 19/19* (2006.01)

(52) U.S. Cl.
CPC .............. *G05B 19/404* (2013.01); *G05B 19/19* (2013.01); *G05B 2219/37323* (2013.01); *G05B 2219/41195* (2013.01)

(58) Field of Classification Search
CPC ................ G05B 19/4141; G05B 2219/33337; G05B 13/02; G05B 19/19; G05B 19/404; G05B 2219/36366; G05B 2219/37323
USPC ....... 318/625, 560, 574, 615, 621, 632, 633, 318/671, 675
See application file for complete search history.

(56) References Cited

U.S. PATENT DOCUMENTS 4,791,575 A * 12/1988 Watts, Jr. ............. G05B 19/184
318/569
4,868,474 A * 9/1989 Lancraft ............ G05B 19/4141
318/562
(Continued)

FOREIGN PATENT DOCUMENTS

JP     S63182706 A     7/1988
JP     H08110808 A     4/1996
(Continued)

OTHER PUBLICATIONS

English Abstract for Japanese Publication No. 2009-087371A, published Apr. 23, 2009, 1 pg.
(Continued)

*Primary Examiner* — Bentsu Ro
*Assistant Examiner* — Thai Dinh
(74) *Attorney, Agent, or Firm* — Fredrikson & Byron, P.A.

(57) ABSTRACT

A motor control system which uses position command values output from control parts for motors and feedback information from axes which are driven by the command values for feedback control of the axes in an environment in which when one or more axes among axes which are driven by motors are driven, the other axes receive interference, which motor control system calculates acceleration of an axis which is driven by a motor by a first control part, sends the calculated acceleration to a second control part using a communication device, multiplies the acceleration which was input at the second control part with a compensation gain to calculate a position compensating value which compensates the position of an axis, adds the calculated position compensating value to the position command value of the axis, and uses the compensated position command value to control the position of the axis.

4 Claims, 14 Drawing Sheets

(56) References Cited

U.S. PATENT DOCUMENTS

| | | | | |
|---|---|---|---|---|
| 5,581,167 | A | * 12/1996 | Kato | G05B 19/19 318/510 |
| 6,741,057 | B2 | * 5/2004 | Iwashita | G05B 19/406 318/568.22 |
| 6,998,810 | B2 | * 2/2006 | Kameyama | G05B 19/19 318/461 |
| 7,750,592 | B2 | * 7/2010 | Eguchi | G05B 13/042 318/561 |

FOREIGN PATENT DOCUMENTS

| JP | H11065663 A | 3/1999 |
|---|---|---|
| JP | 2005227886 A | 8/2005 |
| JP | 2006202019 A | 8/2006 |
| JP | 200987371 A | 4/2009 |
| JP | 2011134280 A | 7/2011 |

OTHER PUBLICATIONS

Untranslated Notification of Reasons for Refusal mailed by Japan Patent Office, Dec. 15, 2015, 3 pages.
Machine translation of Notification of Reasons for Refusal mailed by Japan Patent Office, Dec. 15, 2015, 3 pages.
Untranslated Decision to Grant a Patent mailed by Japan Patent Office, Mar. 22, 2016, 3 pages.
Machine translation of Decision to Grant a Patent mailed by Japan Patent Office, Mar. 22, 2016, 3 pages.

* cited by examiner

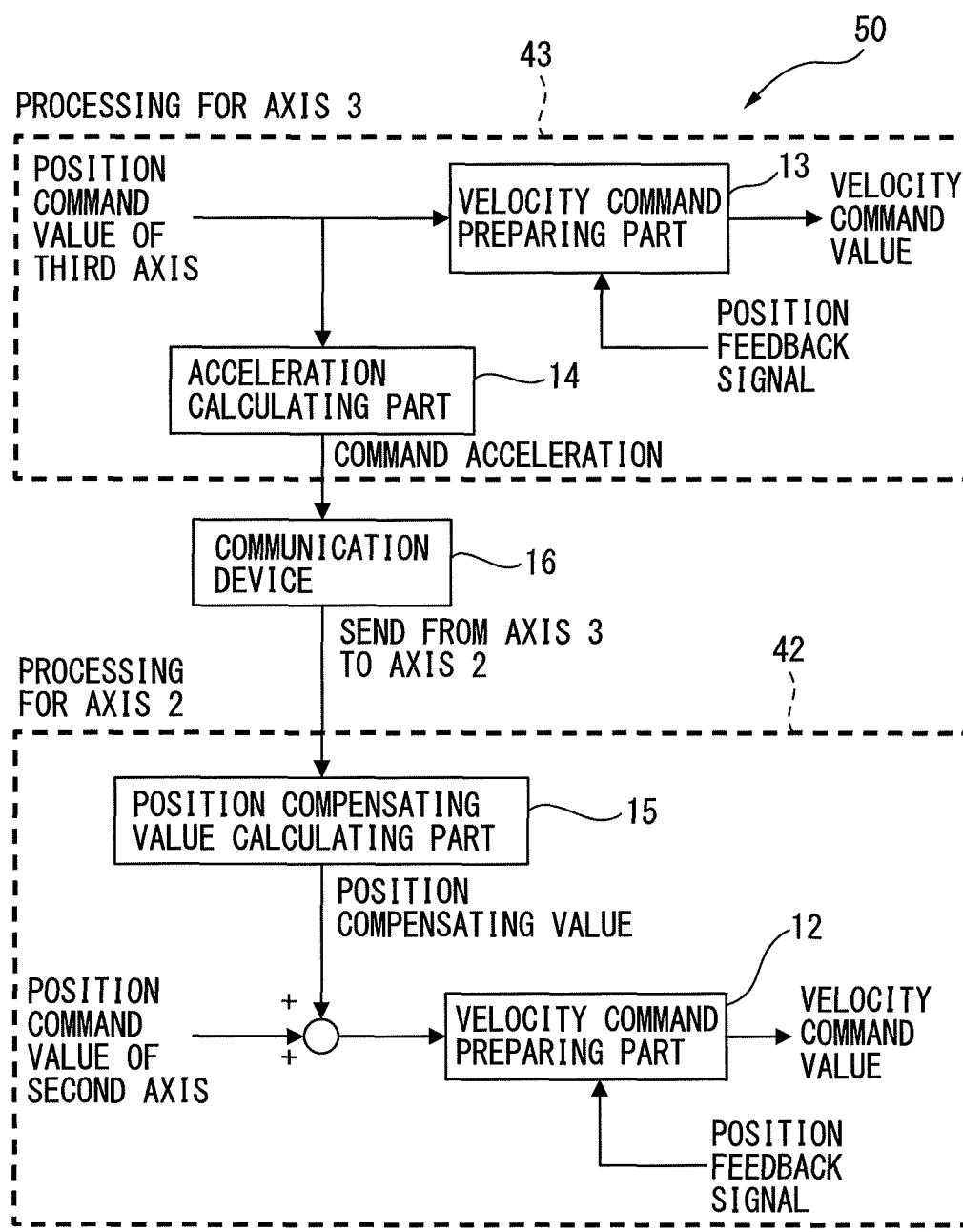

MOTOR CONTROL SYSTEM COMPENSATING INTERFERENCE BETWEEN AXES

BACKGROUND OF THE INVENTION

1. Field of the Invention

The present invention relates to a motor control system which compensates interference between axes.

2. Description of the Related Art

A machine tool generally is provided with control axes such as an X-axis, Y-axis, and Z-axis. These control axes are often designed so that when the axes are operating, their operations do not cause dynamic interference which affects the other axes, but there are also designs, though rare, where such dynamic interference occurs.

Dynamic interference, for example, as illustrated in FIG. 1, includes an eccentric load 92 of unbalanced weight. The case where the rotary axis 93 which makes this eccentric load 92 rotate is placed on a linear axis 91 etc. corresponds to this. In the example which is illustrated in FIG. 1, at the time the linear axis 91 accelerates, a torque is generated at the rotary axis 93 or conversely, at the time the rotary axis 93 rotates, a torque is generated at the linear axis 91. This is referred to as "dynamic interference". If such dynamic interference occurs, control of the control axes will be obstructed and the processing precision of the machine tool will be degraded.

Therefore, some machine tools are provided with the function of compensating the interference force. The function of compensating the interference force is a compensation function which generates a torque so that a torque (force) at a certain control axis cancels out a torque (force) which is generated at another control axis, sends a command acceleration for an accelerating axis to at which interference is desired to be suppressed, calculates the torque which is predicted to occur due to the interference, and cancels this out.

A positioning system which is provided with such a compensation function is disclosed in Japanese Patent Publication No. 2009-087371A. In Japanese Patent Publication No. 2009-087371A, a first actuator which drives a moving member in a first direction and a second actuator which drives the moving member in a second direction are provided. The control system controls the second actuator so that when the first actuator drives the moving member in the first direction, force in the second direction acting on the moving member is reduced. For this reason, in the positioning system which is disclosed in Japanese Patent Publication No. 2009-087371A, it is possible to decrease the force in another direction which could act on the moving member when driving the moving member in a target direction.

On the other hand, even in a machine which is designed so that there is no dynamic interference, in the case of a large-sized machine or other machine with a relatively low rigidity, sometimes acceleration along a certain axis will have an effect on another axis. For example, as illustrated in FIG. 2, when an X-axis 95 which is provided with a positioned object 94 accelerates in the direction of the Z-axis 96, position error proportional to the Z-axis acceleration will occur at the positioned object 94 on the X-axis 95 and therefore the positioning of the positioned object 94 will be affected. The effect which occurs here is believed to be due to mechanical torsion (elastic deformation). There was the problem that position error proportional to the acceleration of a moving axis ended up appearing at other axes.

SUMMARY OF INVENTION

In one aspect, the present invention has as its object the provision of a motor control system in a machine in which axes are controlled to be driven by a motor control system wherein interference between axes where acceleration of movement of one axis appears as position error of another axis can be compensated, that is, a motor control system which enables compensation of position error proportional to acceleration.

According to one embodiment of the present invention, there is provided a motor control system which controls axes in an environment in which axes which are driven by motors are provided and in which when at least one axis is driven, another axis is interfered due to the driven axis, in which motor control system, the system comprises, for the axes, control parts which control movement of the axes and a communication device which sends and receives data between the control parts, each control part is provided with a position command preparing part which prepares a position command value for an axis being driven, a position detector which detects a position of the axis, a velocity command preparing part which uses the position command value from the position command preparing part and a position feedback signal from the position detector to prepare a velocity command value, an acceleration calculating part which calculates an acceleration of each axis, and a position compensating value calculating part which calculates a position compensating value which compensates a position command value of its own axis when acceleration of another axis is input, the communication device sends to the other control part any of a position command value which was generated at a control part, an acceleration which was calculated by said acceleration calculating part, and a position compensating value which was calculated by the position compensating value calculating part, and the position compensating value calculating part calculates the position compensating value by multiplying the acceleration of the other axis with a compensation gain.

According to the motor control system of the present invention, there is the effect that in a machine in which axes are controlled to be driven by a motor control system, interference between axes where acceleration of movement of one axis appears as position error of another axis can be compensated.

BRIEF DESCRIPTION OF THE DRAWINGS

The present invention will be more clearly understood by reference to the figures attached below.

FIG. 15 is a block diagram which illustrates one example of the configuration of the second control part and the third control part which are illustrated in FIG. 13.

DETAILED DESCRIPTION

Below, the attached drawings will be used to explain embodiments of the present invention in detail based on specific examples. In the examples which are explained below, a motor control system which controls positioning of a positioned object by respective motors in an environment in which at least two axes are driven by motors and in which when one axis is driven, another axis is driven and thereby interference between axes occurs will be explained. Note that, the number of motors for positioning a positioned object is not limited, but here, for simplification of the explanation, the case where a positioned object is positioned by first and second axes which are driven by motors will be explained.

Figure 1:
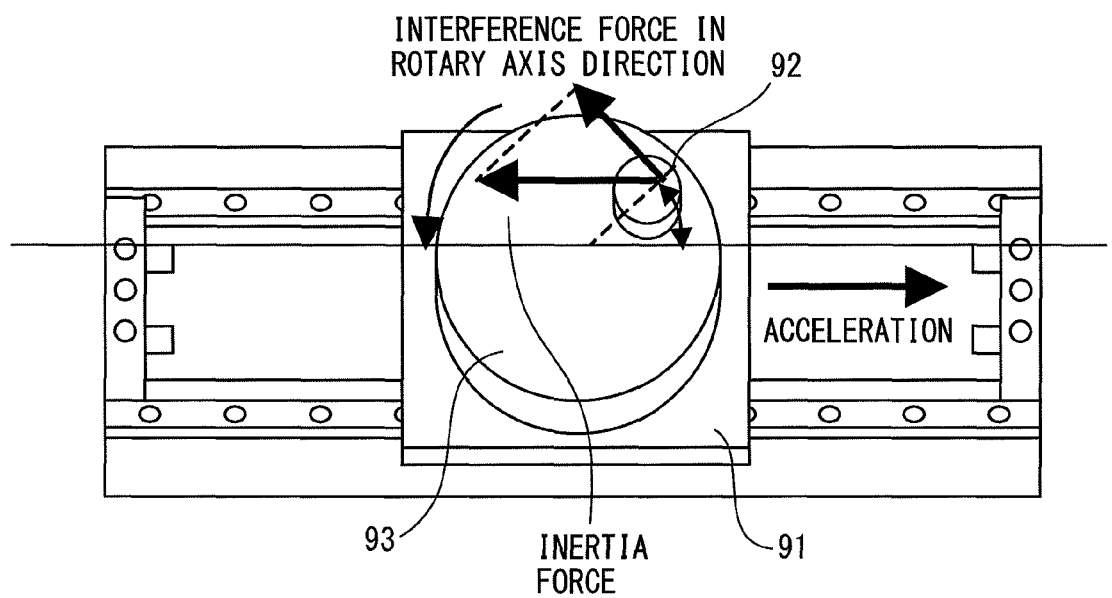
FIG. 1 is a view which explains interference between axes in a machine tool which is provided with a plurality of control axes.
Figure 2:
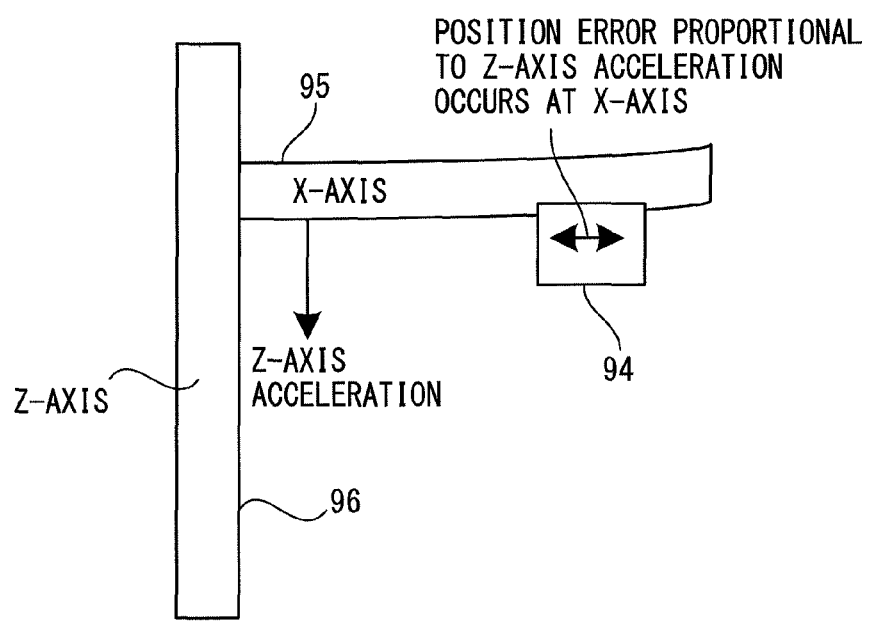
FIG. 2 is a view which explains position error of a positioned object which occurs due a moving axis in a system which controls the position of a positioned object by two axes.
Figure 3:
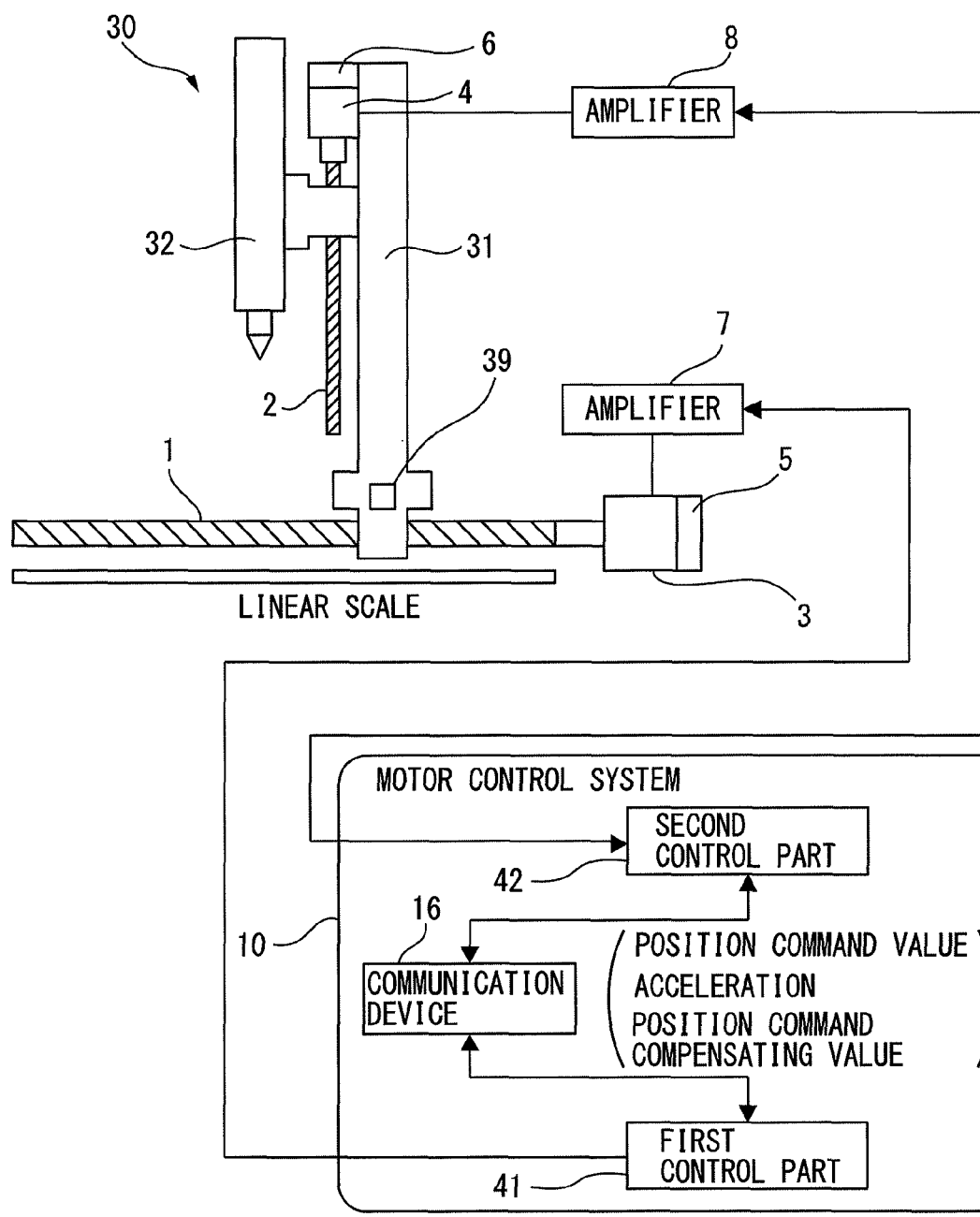
FIG. 3 is a view of a configuration which illustrates the basic configuration of a motor control system of a first embodiment of the present invention.

FIG. 3 illustrates the basic configuration of a motor control system 10 of the present invention. The positioned object which is positioned by the motor control system 10 will be assumed to be a machine tool 30. Further, the machine tool 30 is made one comprised of a horizontal direction moving part 31 and a vertical direction moving part 32. The horizontal direction moving part 31 is engaged with a first rotary axis 1. If the first axis 1 is driven to rotate by the first servo motor 3, that moving part moves in the horizontal direction. Further, the vertical direction moving part 32 is engaged with a second axis 2. If the second axis 2 is driven to rotate by the second servo motor 4, that moving part moves along the longitudinal direction of the horizontal direction moving part 31 in the vertical direction. The first and second servo motors 3 and 4 respectively have rotary encoders 5 and 6 attached to them. Further, in the present embodiment, the horizontal direction moving part 31 has an acceleration detector 39 attached to it.

Figure 12A:
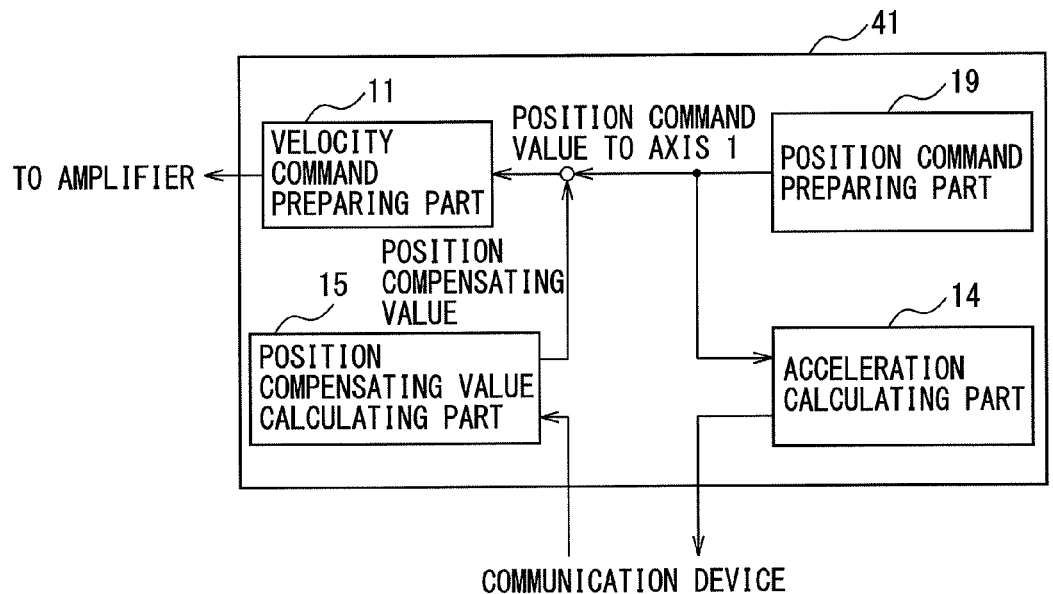
FIG. 12A is a block diagram which illustrates one example of the internal configuration of the first control part which is illustrated in FIG. 3.

On the other hand, inside of the motor control system 10, a first control part 41 and second control part 42 which generate position command values for the first and second servo motors 3 and 4 and a communication device 16 which sends and receives data between the first and second control parts 41 and 42 are provided. Here, one example of the internal configurations of the first control part 41 and the second control part 42 will be explained using FIG. 12A and FIG. 12B together. The first control part 41, as illustrated in FIG. 12A, is provided with a velocity command preparing part 11, acceleration calculating part 14, position compensating value calculating part 15, and position command preparing part 19 for driving the first servo motor. The acceleration calculating part 14 calculates the acceleration of the axis 1. Further, the position compensating value calculating part 15 calculates a position compensating value which compensates the position of the axis 1 when acceleration of the axis 2 is input. The position command preparing part 19 generates a position command value for the axis 1.

Figure 12B:
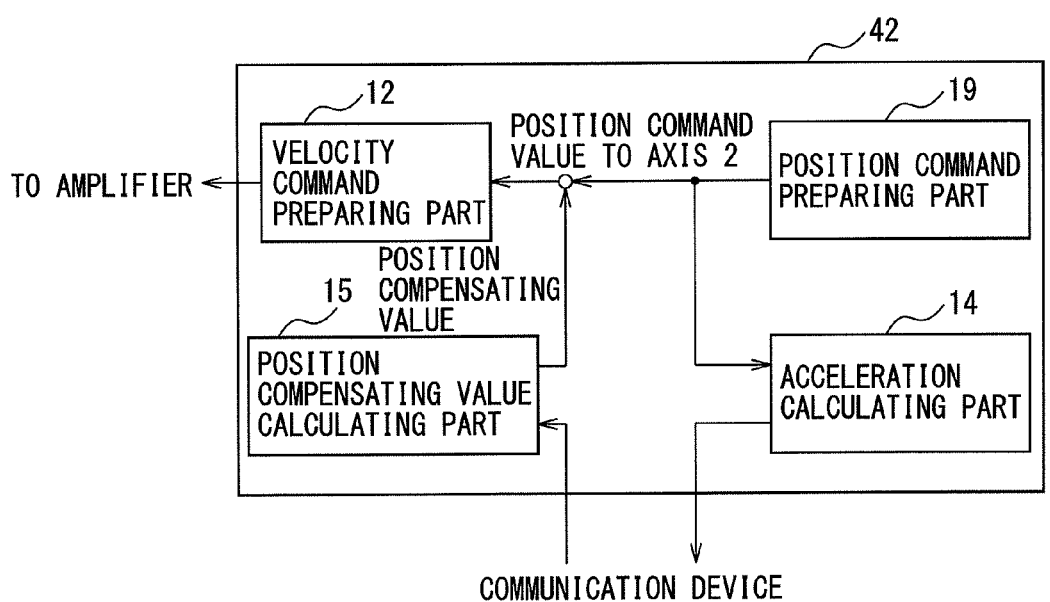
FIG. 12B is a block diagram which illustrates one example of the internal configuration of the second control part which is illustrated in FIG. 3.

Similarly, the second control part 42, as illustrated in FIG. 12B, is provided with a velocity command preparing part 12, position compensating value calculating part 15, acceleration calculating part 14, and position command preparing part 19 for driving the second servo motor. The acceleration calculating part 14 calculates the acceleration of the axis 2. Further, the position compensating value calculating part 15 calculates a position compensating value which compensates the position of the axis 2 when acceleration of the axis 1 is input. The position command preparing part 19 generates a position command value for the axis 2.

Note that, in the present embodiment, between the velocity command preparing parts 11 and 12 and the first and second servo motors 3 and 4, amplifiers 7 and 8 are provided. The amplifiers 7 and 8 may also be provided at the inside of the motor control system 10. The velocity command preparing parts 11 and 12 for driving the first and second servo motors add to the position command values from the position command preparing parts 19 series of position feedback information from the first and second axes 1 and 2 for feedback control of the first and second axes 1 and 2. The series of position feedback information are sent from the rotary encoders 5 and 6 which are attached at the first and second servo motors 3 and 4.

An acceleration calculating part 14 calculates the acceleration of the horizontal direction moving part 31 in the horizontal direction when the first axis 1 is driven. The communication device 16 sends the acceleration of the horizontal direction moving part 31 in the horizontal direction which was calculated by that one acceleration calculating part 14 to the other position compensating value calculating part 15. That other position compensating value calculating part 15 uses the input acceleration as the basis to calculate a position compensating value of the second axis 2 and adds the calculated position compensating value of the second axis 2 to the position command value of the second axis 2 which was sent from that other position command preparing part 19 to the other velocity command preparing part 12 for driving the second servo motor.

The motor control system 10 which is illustrated in FIG. 3 depicts a first embodiment of the present invention. This is characterized in the point that the position compensating value calculating part 15 (see FIG. 12A and FIG. 12B) to which the acceleration of the first axis 1 is input and which multiplies the acceleration of the first axis 1 with a compensation gain to calculate a position compensating value and adds this to the position command value of the second axis to compensate it. Further, in the motor control system 10, the communication device 16 sends the signals from the acceleration calculating parts 14 which are illustrated in FIG. 12A and FIG. 12B to the other position compensating value calculating parts 15, but the position of the communication device 16 need not necessarily be between the acceleration calculating parts 14 and the position compensating value calculating parts 15. Several examples are possible. Therefore, examples in which the layouts of the acceleration calculating parts 14, position compensating value calculating parts 15, and communication device 16 are made different and several examples in which the methods of calculation of acceleration by the acceleration calculating parts 14 are made different will be explained using FIG. 4 to FIG. 9.

First Example

Case where Data Transferred by Communication Device is Command Acceleration

Figure 4:
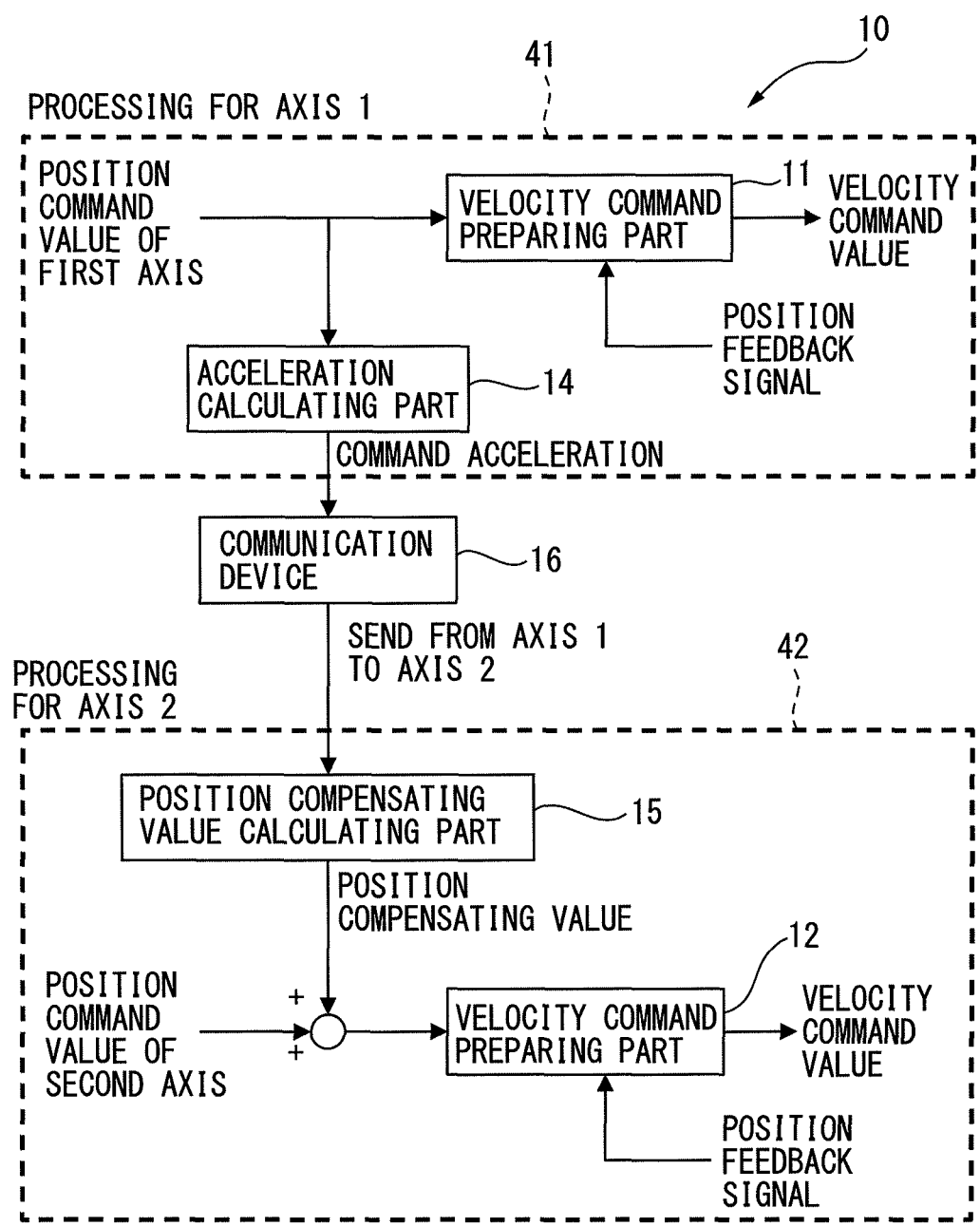
FIG. 4 is a block diagram which illustrates the configuration of a first example in the motor control system which is illustrated in FIG. 3.

FIG. 4 illustrates the configuration of an example in the case where the data which is sent by the communication device 16 is the command acceleration and illustrates the configuration of the inside of the motor control system 10 which is illustrated in FIG. 3. In the first example, inside the motor control system 10, the processing for the axis 1 is performed by the first control part 41, while the processing for the axis 2 is performed by the second control part 42. Note that, as illustrated in FIG. 12A and FIG. 12B, the first control part 41 and the second control part 42 respectively have the acceleration calculating parts 14, the position compensating value calculating parts 15, and position command preparing parts 19, but in the following explanation, illustration of non-operating members will be omitted.

The processing for the axis 1 is performed by the velocity command preparing part 11 and acceleration calculating part 14 for driving the first servo motor at the first control part 41. The velocity command preparing part 11 for driving the first servo motor uses the position command value from the position command preparing part 19 which is illustrated in FIG. 3 as the basis to calculate the velocity command value of the first axis. Since it is known art, illustration was omitted, but from the velocity command preparing part to the amplifier 7, usually there are a torque command preparing part which uses the velocity command value and the velocity feedback value to prepare a torque command value and a voltage command preparing part which uses the torque command value and the current feedback value to prepare a voltage command to be output to the amplifier. Due to the torque command preparing part and the voltage command preparing part, the first servo motor 3 is controlled to become a velocity which matches the velocity command value. The position feedback signal is sent from the rotary encoder 5. Further, the acceleration calculating part 14 uses the position command value of the first axis 1 from the position command preparing part 19 as the basis to calculate the acceleration of the first axis and outputs this as the command acceleration to the communication device 16. Further, the communication device 16 sends the command acceleration which was input from the acceleration calculating part 14 to the position compensating value calculating part 15 at the second control part 42.

At the second control part 42, the command acceleration which was input from the communication device 16 is used as the basis for performing the processing for the axis 2. The processing for the axis 2 is performed by the velocity command preparing part 12 and the position compensating value calculating part 15 for driving the second servo motor. The position compensating value calculating part 15 calculates the position compensating value of the second axis 2. As illustrated in FIG. 3, if the first axis 1 is driven and the horizontal direction moving part 31 moves along the first axis 1 in the horizontal direction, the second axis 2 and together with that the vertical direction moving part 32 as a whole receive the effect of acceleration in movement of the horizontal direction moving part 31 in the horizontal direction. The position compensating value calculating part 15 at the second control part 42 uses the command acceleration which was input from the acceleration calculating part 14 through the communication device 16 to calculate the position compensating value of the second axis 2. The position compensating value of the second axis 2 is calculated by the position compensating value calculating part 15 multiplying the command acceleration with the compensation gain. The compensation gain is a coefficient and is a constant. The compensation gain is typically 10 to 100 $\mu m/(m/s^2)$. By making the compensation gain a constant, the position compensating value (=compensation gain×acceleration) is proportional to the acceleration.

In the processing for the axis 2 at the second control part 42, the position compensating value of the second axis 2 which was calculated by the position compensating value calculating part 15 is added to the position command value of the second axis 2 from the position command preparing part 19 (see FIG. 12B) whereby the position command value of the second axis 2 is compensated. The compensated position command value is input to the velocity command preparing part 12 for driving the second servo motor. The velocity command preparing part 12 uses the position command value which was compensated by the position compensating value as the basis to calculate the velocity command value of the second axis. Since it is known art, illustration was omitted, but between the velocity command preparing part 12 and amplifier 8, usually there are a torque command preparing part which uses the velocity command value and the velocity feedback value to prepare a torque command value and a voltage command preparing part which uses the torque command value and the current feedback value to prepare a voltage command to be output to the amplifier. Due to the torque command preparing part and the voltage command preparing part, the second servo motor 4 is controlled to become a velocity which matches the velocity command value.

Figure 5:
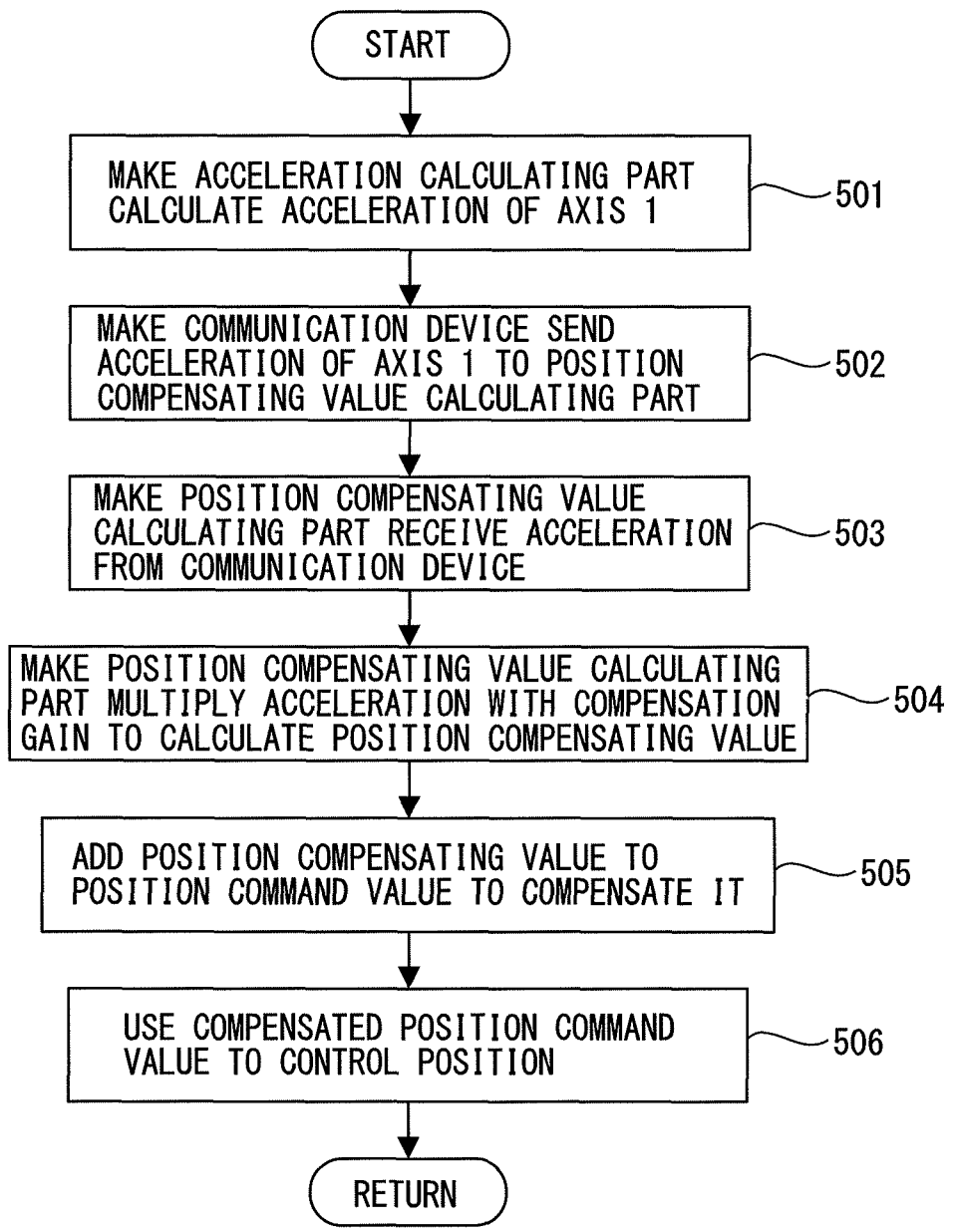
FIG. 5 is a flow chart which illustrates a control routine of the motor control system which is illustrated in FIG. 4.

FIG. 5 is a flow chart which illustrates a control routine in a first example of the motor control system 10 which is illustrated in FIG. 4. In the present embodiment, first, the acceleration calculating part of the first control part calculates the acceleration of the first axis (in figure, indicated as axis 1) (step 501), then the communication device sends the acceleration of the first axis which was calculated by the acceleration calculating part to the position compensating value calculating part of the second control part (step 502). Due to this processing of the communication device, the position compensating value calculating part of the second control part receives the acceleration of the first axis from the communication device (step 503). The position compensating value calculating part which receives the acceleration of the first axis multiplies the acceleration with the compensation gain to calculate the position compensating value of the second axis (step 504).

The compensating value of the second axis which is calculated by the position compensating value calculating part of the second control part is added to the position command value of the second axis which is sent from the position command preparing part whereby the position command value of the second axis is compensated (step 505).

In the first example which was explained above, the acceleration calculating part 14 of the first control part 41 used the position command value of the first axis 1 from the position command preparing part 19 as the basis to calculate acceleration of the first axis and output this as the command acceleration to the communication device 16. On the other hand, the acceleration of the first axis may be acquired by a method other than calculation based on the position command value of the first axis 1 from the position command preparing part 19. This method will be explained using FIG. 6 and FIG. 7.

Figure 6:
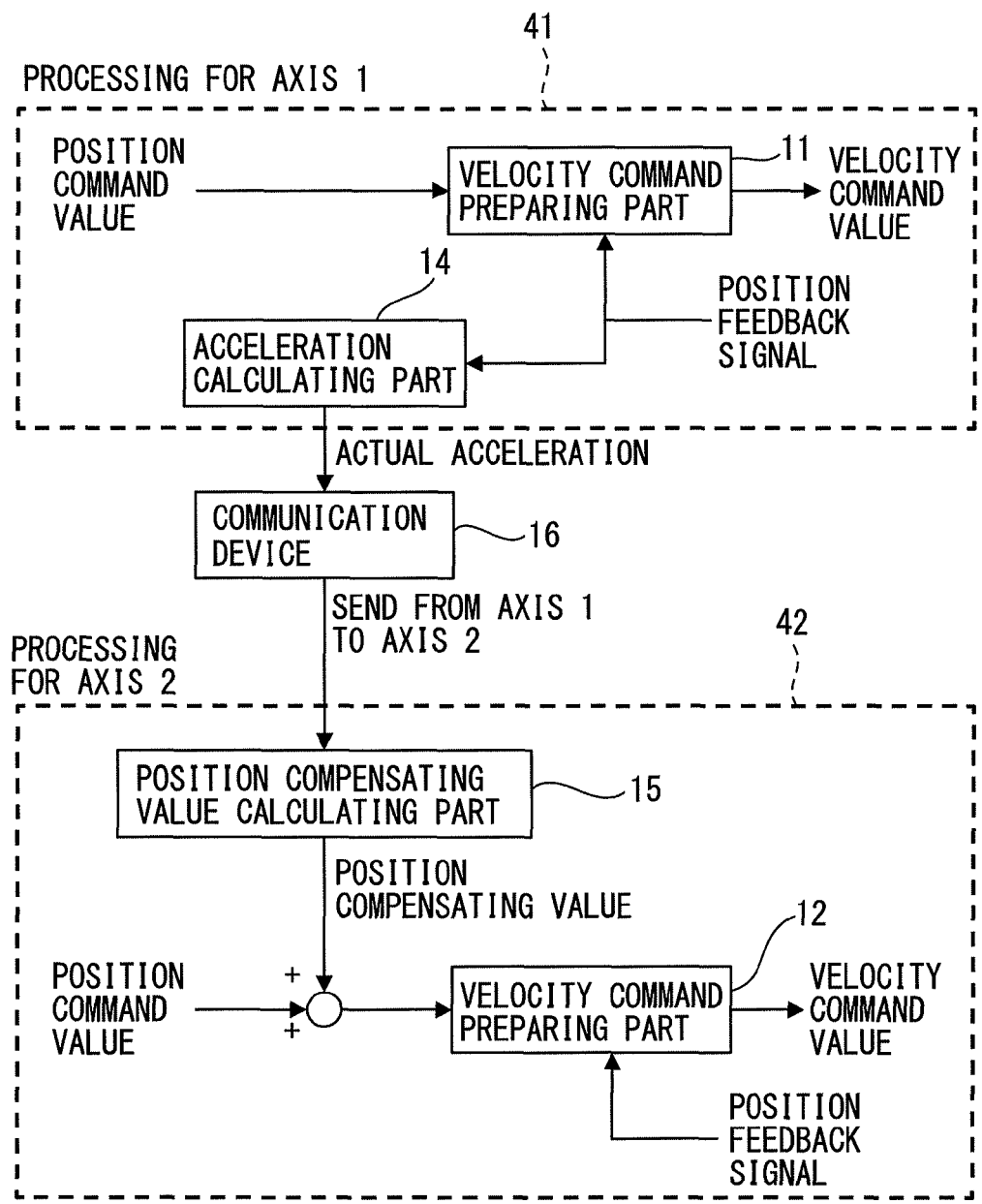
FIG. 6 is a block diagram which illustrates the configuration of a modification of the first example in the motor control system which is illustrated in FIG. 3.

FIG. 6 illustrates the configuration of a modification of the motor control system 10 of the first example. The acceleration calculating part 14 of the first control part 41 uses the position feedback signal of the first axis 1 as the basis to calculate the acceleration of the first axis 1. In this case, what is obtained as a result of the calculation at the acceleration calculating part 14 is the actual acceleration of the first axis 1. The processing at the second control part 42 after the actual acceleration of the first axis 1 is sent from the acceleration calculating part 14 to the communication device 16 is the same as in the first example, so the subsequent explanation will be omitted.

Figure 7:
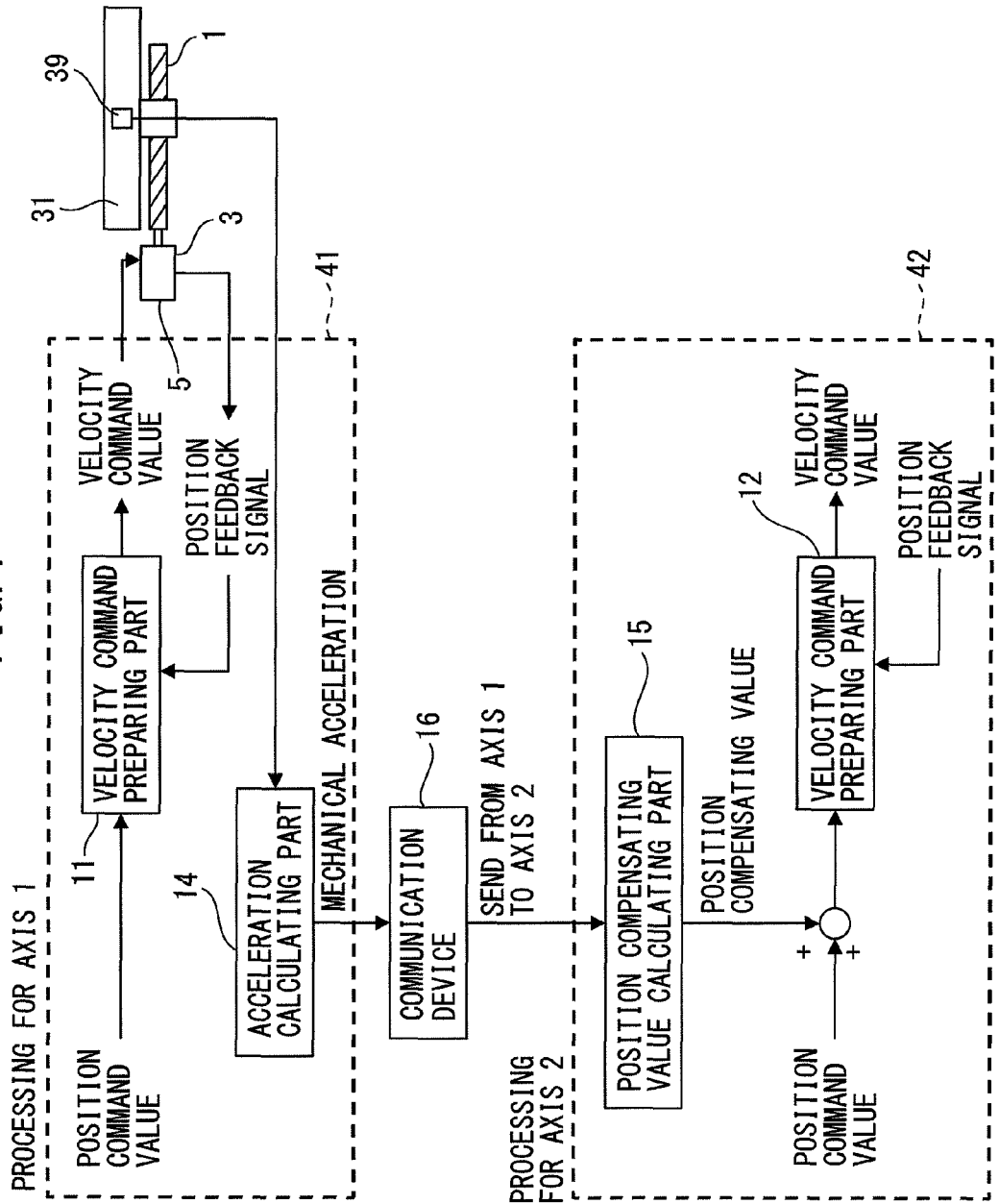
FIG. 7 is a block diagram which illustrates the configuration of another modification of the first example in the motor control system which is illustrated in FIG. 3.

FIG. 7 illustrates the configuration of another modification of the motor control system 10 of the first example. The acceleration calculating part 14 of the first control part 41 uses the signal from the acceleration detector 39 which is attached to the first axis 1 as the basis to calculate the acceleration of the first axis 1. Here, the acceleration of the first axis 1 which is obtained by the acceleration detector 39 will be called the "mechanical acceleration". In this case, what is obtained as a result of the calculation at the acceleration calculating part 14 is the mechanical acceleration of the first axis 1. The processing at the second control part 42 after the mechanical acceleration of the first axis 1 is sent from the acceleration calculating part 14 to the communication device 16 is the same as the first example, so subsequent explanation will be omitted.

Second Example

Case where Data Transferred by Communication Device is Position Command Value

Figure 8:
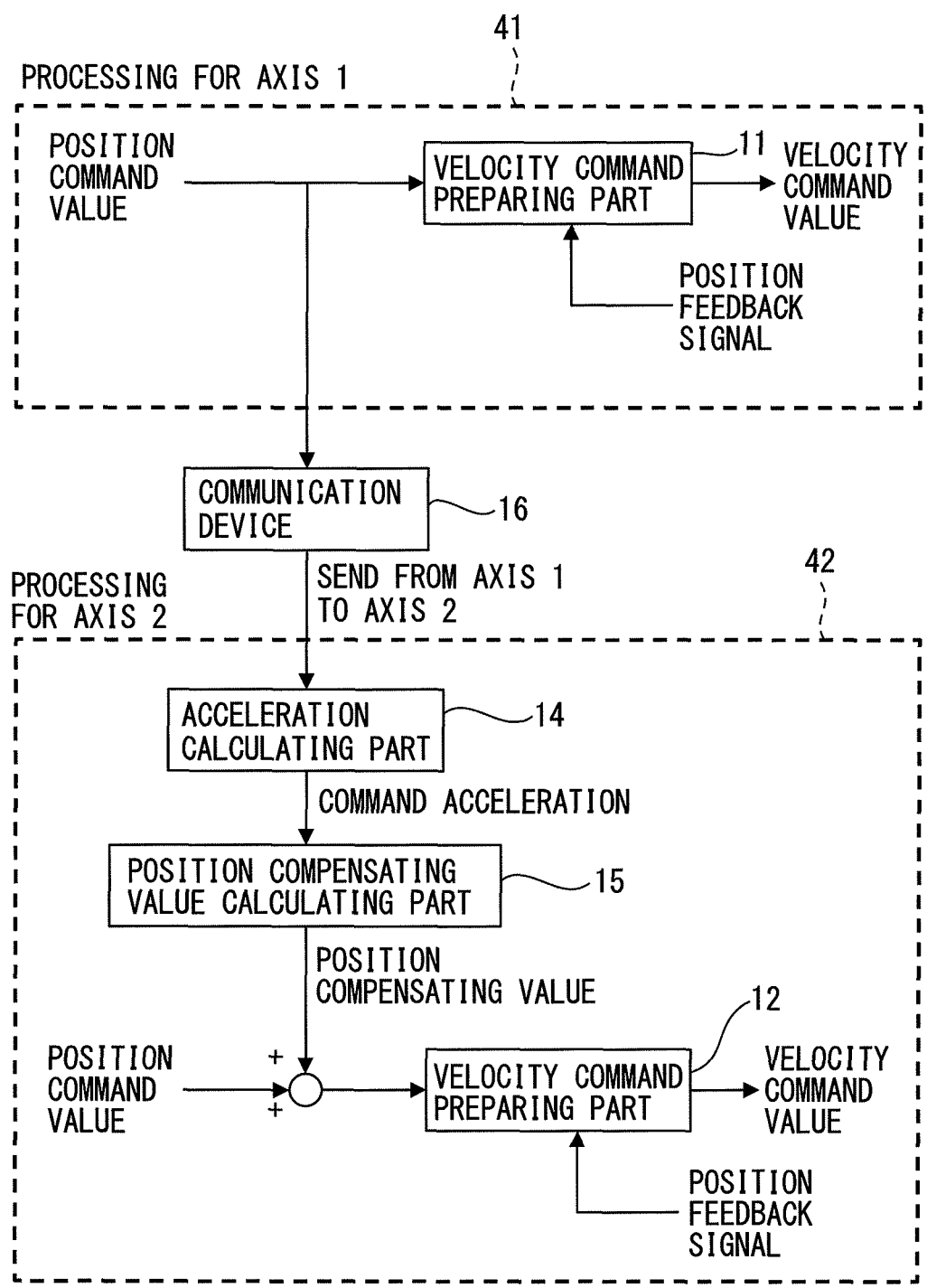
FIG. 8 is a block diagram which illustrates the configuration of a second example in the motor control system which is illustrated in FIG. 3.

FIG. 8 illustrates the configuration of a second example in the case where the data which is sent from the first control part 41 by the communication device 16 is the position command value of the first axis which is sent from the position command preparing part. In the second example, the processing for the axis 1 is performed by the first control part 41 at the input side of the communication device 16, while the processing for the axis 2 is performed at the second control part 42 at the output side of the communication device 16.

In the processing for the axis 1, the control of the first axis is performed by the velocity command preparing part 11 for driving the first servo motor. The velocity command preparing part 11 for driving the first servo motor uses the position command value from the position command preparing part 19 which is illustrated in FIG. 3 as the basis to calculate the velocity command value of the first axis. Since it is known art, illustration was omitted, but from the velocity command preparing part to the amplifier 7, usually there are a torque command preparing part which uses the velocity command value and the velocity feedback value to prepare a torque command value and a voltage command preparing part which uses the torque command value and the current feedback value to prepare a voltage command to be output to the amplifier. Due to the torque command preparing part and the voltage command preparing part, the first servo motor 3 is controlled to become a velocity which matches the velocity command value. Further, the position command value from the position command preparing part 19 is branched and input to the communication device 16. The communication device 16 sends the input position command value of the first axis to the acceleration calculating part 14 at the second control part 42 which performs the processing for the axis 2.

The processing for the axis 2 is performed by the acceleration calculating part 14, position compensating value calculating part 15, and velocity command preparing part 12 at the second control part 42. The acceleration calculating part 14 uses the position command value of the first axis 1 which was sent from the communication device 16 as the basis to calculate the acceleration of the first axis and inputs this as the command acceleration to the position compensating value calculating part 15. The position compensating value calculating part 15 uses the command acceleration which was input from the acceleration calculating part 14 to calculate the position compensating value of the second axis 2. The position compensating value of the second axis 2 is calculated by the position compensating value calculating part 15 multiplying the command acceleration with the compensation gain.

In the processing for the axis 2, the position compensating value which was calculated by the position compensating value calculating part 15 is added to the position command value from the position command preparing part 19 whereby the position command value is compensated. The position command value which was compensated by the position compensating value is input to the velocity command preparing part 12 for driving the second servo motor. The velocity command preparing part 12 uses the position command value which was compensated by the position compensating value as the basis to calculate the velocity command value of the second axis. Since it is known art, illustration was omitted, but from the velocity command preparing part to the amplifier 8, usually there are a torque command preparing part which uses the velocity command value and the velocity feedback value to prepare a torque command value and a voltage command preparing part which uses the torque command value and the current feedback value to prepare a voltage command to be output to the amplifier. Due to the torque command preparing part and the voltage command preparing part, the second servo motor 4 is controlled to become a velocity which matches the velocity command value.

Third Example

Case where Data Transferred by Communication Device is Compensating Value

Figure 9:
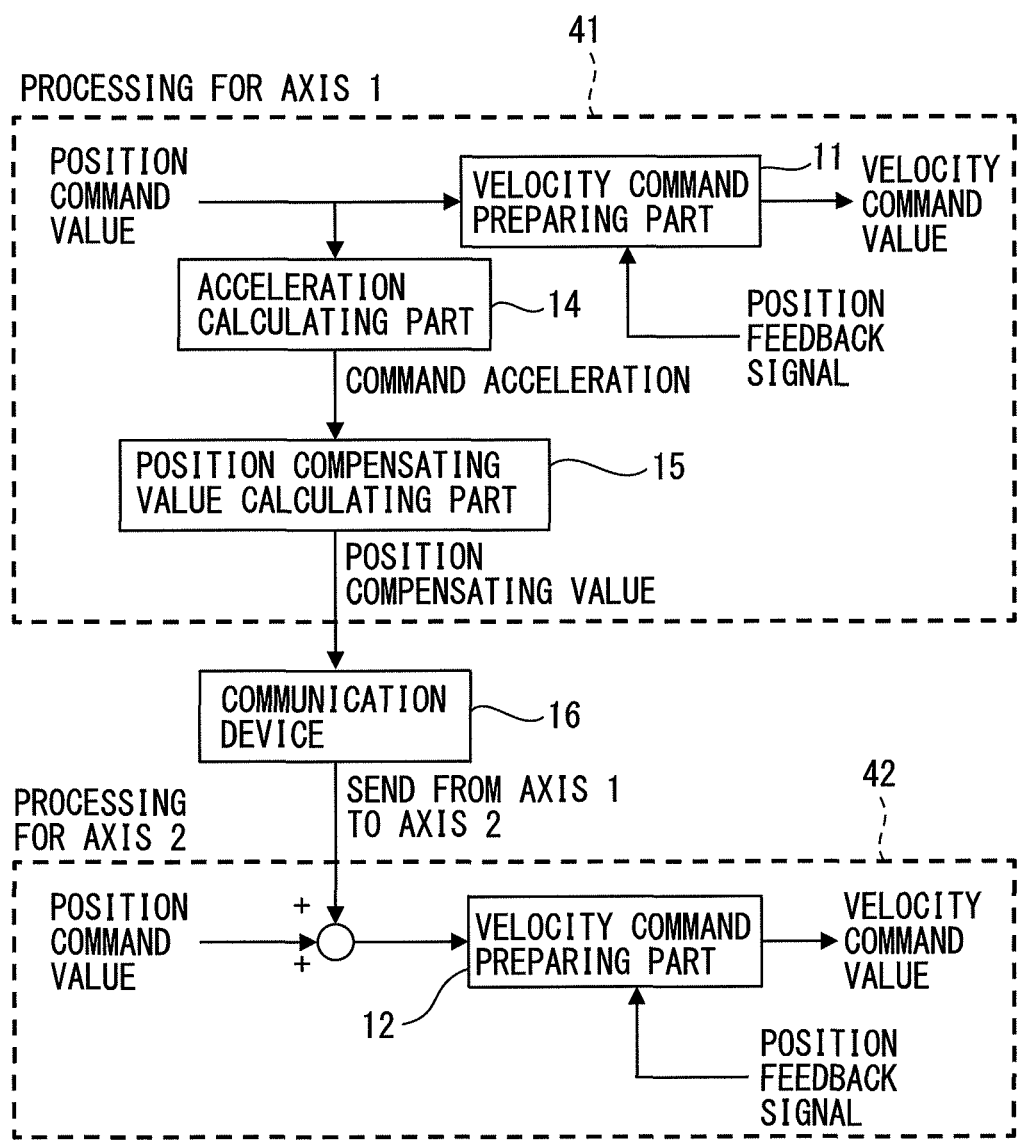
FIG. 9 is a block diagram which illustrates the configuration of a third example in the motor control system which is illustrated in FIG. 3.

FIG. 9 illustrates the configuration of a third example in the case where the data which is sent by the communication device 16 is the position compensating value which is sent from the position compensating value calculating part 15 and illustrates the configuration of the inside of the motor control system 10 which is illustrated in FIG. 3. In the third example as well, at the inside of the motor control system 10, the processing for the axis 1 is performed at the input side of the communication device 16 and the processing for the axis 2 is performed at the output side of the communication device 16.

The processing for the axis 1 is performed by the velocity command preparing part 11, acceleration calculating part 14, and position compensating value calculating part 15 for driving the first servo motor at the first control part 41. The velocity command preparing part 11 for driving the first servo motor uses the position command value from the position command preparing part 19 which is illustrated in FIG. 12A as the basis to calculate the velocity command value of the first axis. Since it is known art, illustration was omitted, but from the velocity command preparing part to the amplifier 7, usually there are a torque command preparing part which uses the velocity command value and the velocity feedback value to prepare a torque command value and a voltage command preparing part which uses the torque command value and the current feedback value to prepare a voltage command to be output to the amplifier. Due to the torque command preparing part and the voltage command preparing part, the first servo motor 3 is controlled to become a velocity which matches the velocity command value.

Further, the acceleration calculating part 14 uses the position command value of the first axis 1 from the position command preparing part 19 as the basis to calculate the acceleration of the first axis and sends this as the command acceleration to the position compensating value calculating part 15. The position compensating value calculating part 15 uses the command acceleration which was input from the acceleration calculating part 14 to calculate the position compensating value of the second axis 2. The position compensating value of the second axis 2 is calculated by the position compensating value calculating part 15 multiplying the command acceleration with the compensation gain. The position compensating value calculating part 15 sends the calculated position compensating value of the second axis 2 to the communication device 16.

This being so, the communication device 16 sends the position compensating value which was input from the position compensating value calculating part 15 of the first control part 41 to the second control part 42. In the processing for the axis 2 at the second control part 42, the input position compensating value is added to the position command value from the position command preparing part 19 to compensate the position command value. The position command value which was compensated by the position compensating value is input to the velocity command preparing part 12 for driving the second servo motor. The velocity command preparing part 12 uses the position command value to which the position compensating value was added for compensation as the basis to calculate the velocity command value of the second axis. Since it is known art, illustration was omitted, but from the velocity command preparing part to the amplifier 8, usually there are a torque command preparing part which uses the velocity command value and the velocity feedback value to prepare a torque command value and a voltage command preparing part which uses the torque command value and the current feedback value to prepare a voltage command to be output to the amplifier. Due to the torque command preparing part and the voltage command preparing part, the second servo motor 4 is controlled to become a velocity which matches the velocity command value.

In the first to third examples which were explained above, the acceleration calculating part 14 and the position compensating value calculating part 15 are provided both at the first control part 41 which performs the processing for the first axis 1 and the second control part 42 which performs the processing for the second axis 2. Accordingly, depending on the processing, it is sufficient to use the acceleration calculating part 14 and the position compensating value calculating part 15 which are at either of the first control part 41 and the second control part 42. For this reason, the information which the communication device 16 sends may also be any of the position command value, command acceleration, and position compensating value.

Figure 10:
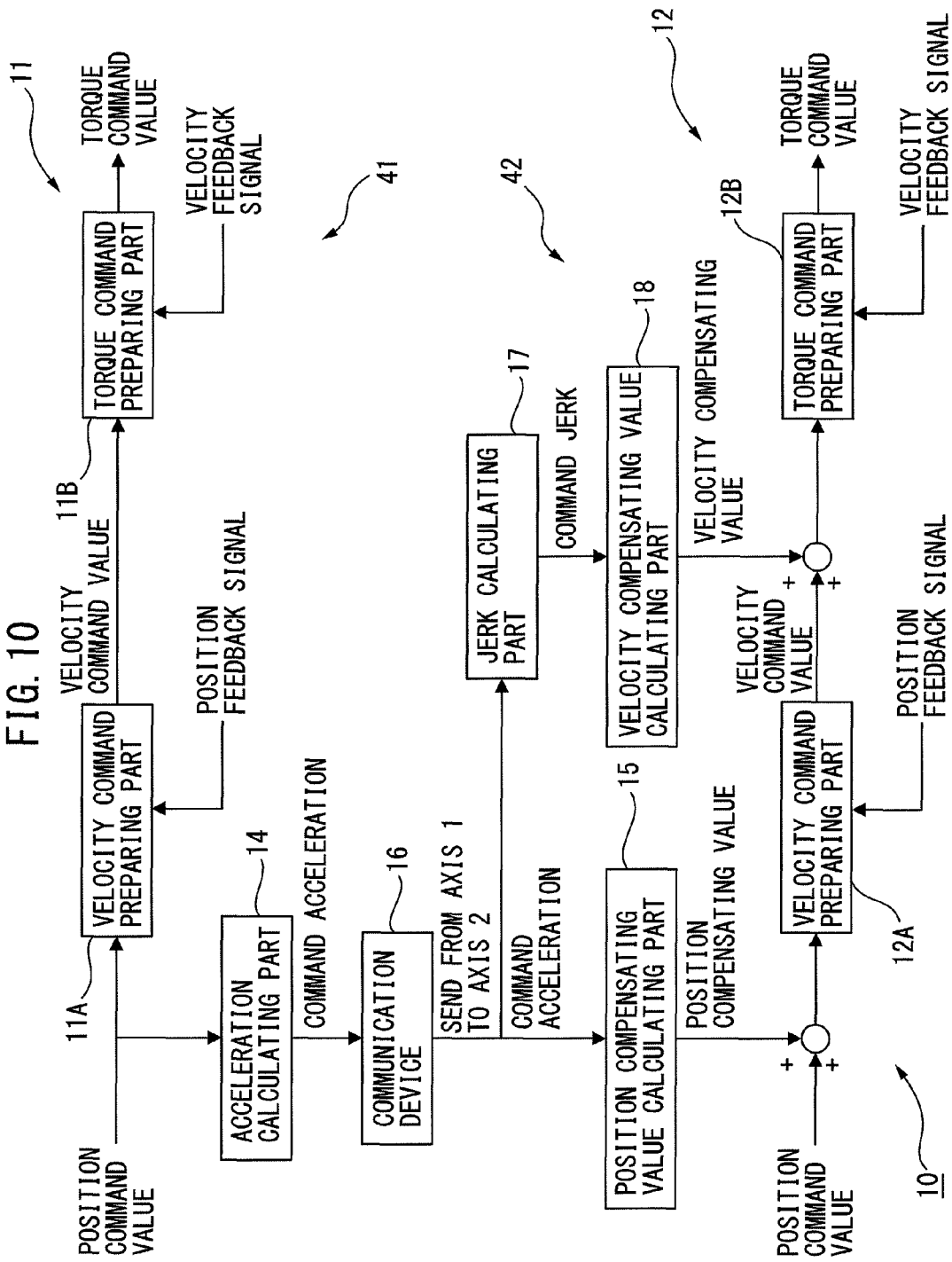
FIG. 10 is block diagram which illustrates the configuration of a motor control system of a second embodiment of the present invention.

The motor control system 10 which is illustrated in FIG. 10 depicts the second embodiment of the present invention and is an embodiment in which feed forward control is employed. In the second embodiment as well, the processing for the axis 1 is performed at the first control part 41, while the processing for the axis 2 is performed at the second control part 42. In feed forward control in a motor control system, when commanding the position command value, the differential is added to the velocity command value. Due to this, the time until the position feedback value converges to the position command value can be shortened. In the second embodiment, a compensation gain proportional to the acceleration of the first axis is used to compensate the position command value of the second axis and the differential of the acceleration of the first axis, referred to as the "jerk", is used to compensate the velocity command value of the second axis. Due to this, the time until the position compensating value of the second axis, which is proportional to the acceleration of the first axis, is reflected into the position feedback value is shortened. The "jerk" depicts the amount of change of the acceleration of the first axis.

For this reason, in the second embodiment, the first control part 41 has a velocity command preparing part 11 which uses the position command value and position feedback value to prepare a velocity command value and a torque command preparing part 11B which uses the velocity command value and the velocity feedback value to prepare a torque command value. Since it is known art, illustration was omitted, but from the torque command preparing part 11B to the amplifier 7, there is usually a voltage command preparing part which uses the torque command value and the current feedback value to prepare a voltage command to be output to the amplifier. Due to the voltage command preparing part, the amplifier 7 is controlled so that current which matches the torque command value flows to the first servo motor 3.

In the second embodiment, in the same way as the first example of the first embodiment, the position command value of the first axis is sent to the acceleration calculating part 14 where the acceleration of the first axis is calculated and is output as the command acceleration. In the second embodiment, the acceleration of the first axis which was calculated at the acceleration calculating part 14 is sent to the communication device 16. The communication device 16 sends the acceleration of the first axis as the command acceleration to the position compensating value calculating part 15 of the second control part 42 and to the jerk calculating part 17. In the second embodiment, the second control part which performs the processing for the axis 2 at the motor control system 10 has a velocity command preparing part 12A and a torque command preparing part 12B which uses the velocity command value and the velocity feedback value to prepare a torque command value.

At the position compensating value calculating part 15, the position compensating value of the second axis is calculated. This position compensating value is added to the position command value of the second axis and input to the velocity command preparing part 12A. The velocity command preparing part 12A uses the position command value comprised of the position command value from the position command preparing part 19 which is illustrated in FIG. 12B compensated by the position compensating value from the position compensating value calculating part 15 and the position feedback signal from the second servo motor 4 as the basis to calculate the velocity command value of the second axis and sends the calculated velocity command value to the torque command preparing part 12B.

At the jerk calculating part 17 to which the acceleration of the first axis which was calculated by the acceleration calculating part 14 was input, the amount of change of the acceleration of the first axis, that is, the jerk of the first axis, is calculated. The jerk of the first axis is input from the jerk calculating part 17 to the velocity compensating value calculating part 18 where the velocity compensating value of the second axis is calculated. The velocity compensating value calculating part 18, in the same way as the position compensating value calculating part 15, calculates the velocity compensating value of the second axis by multiplying the command jerk from the jerk calculating part 17 with the compensation gain.

The velocity compensating value of the second axis is added to the velocity command value of the second axis which is output from the velocity command preparing part 12A and input to the torque command preparing part 12B. The torque command preparing part 12B uses the velocity command value which was compensated by the velocity compensating value and the velocity feedback signal from the second servo motor 4 as the basis to calculate the torque command value of the second axis. Since it is known art, illustration was omitted, but from the torque command preparing part to the amplifier 8, there is usually a voltage command preparing part which uses the torque command value and the current feedback value to prepare a voltage command to be output to the amplifier. Due to the voltage command preparing part, the amplifier 8 is controlled so that a current which matches the torque command value flows to the second servo motor 4.

Figure 11:
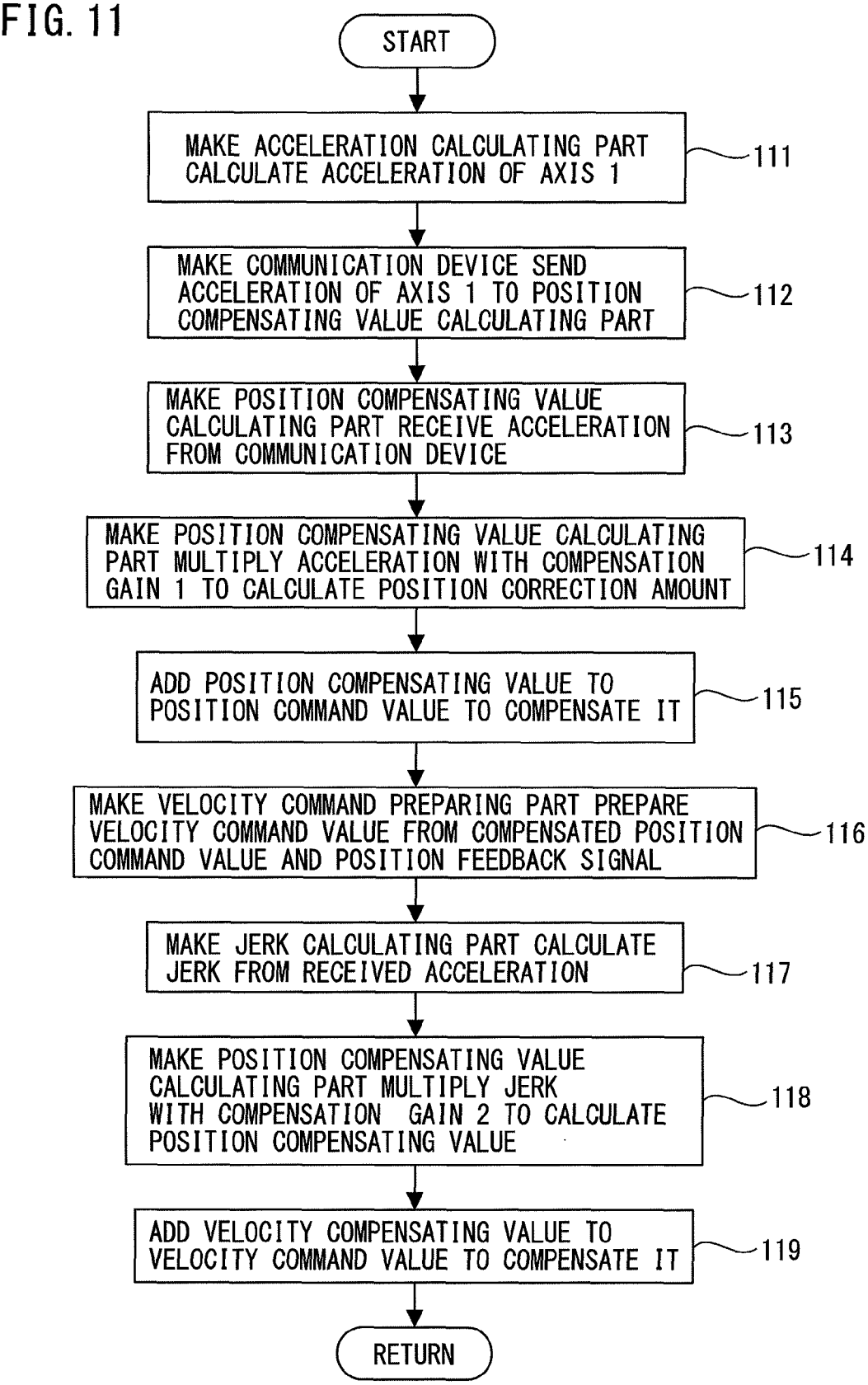
FIG. 11 is a flow chart which illustrates a control routine of the motor control system which is illustrated in FIG. 10.

FIG. 11 is a flow chart which illustrates the control routine of the motor control system 10 which is illustrated in FIG. 10. In the present embodiment, first, the acceleration calculating part of the first control part calculates the acceleration of the first axis (in the figure, indicated as the "axis 1") (step 111) and the communication device sends the acceleration of the first axis which was calculated by the acceleration calculating part to the position compensating value calculating part of the second control part (step 112). Due to this processing of the communication device, the position compensating value calculating part receives the acceleration of the first axis from the communication device (step 113). The position compensating value calculating part which receives the acceleration of the first axis multiplies this acceleration with the first compensation gain (in figure, indicated as "compensation gain 1") to calculate the position compensating value of the second axis (step 114).

The compensating value of the second axis which was calculated by the position compensating value calculating part is added to the position command value of the second axis which is sent from the position command preparing part whereby the position command value of the second axis is compensated (step 115). The velocity command preparing part uses the compensated position command value of the second axis and the position feedback value to prepare a velocity command value (step 116).

On the other hand, the jerk calculating part uses the acceleration of the first axis which was sent from the communication device as the basis to calculate the jerk of the first axis (step 117) and inputs the calculated jerk of the first axis to the velocity compensating value calculating part. The velocity compensating value calculating part to which the jerk of the first axis was input multiplies the jerk of the first axis with the second compensation gain (in the figure, indicated as "compensation gain 2") to calculate the velocity compensating value of the second axis (step 118). The velocity compensating value of the second axis which the velocity compensating value calculating part calculated is added to the velocity command value which was output from the velocity command preparing part whereby the velocity command value of the second axis is compensated (step 119).

The thus compensated velocity command value of the second axis is input to the torque command preparing part of the second axis. Further, the torque command preparing part of the second axis uses the compensated velocity command value of the second axis and velocity feedback signal from the second servo motor 4 as the basis to calculate the torque command value of the second axis. The voltage command preparing part sends the amplifier a command so that the torque command value and the current feedback value of the motor match.

In the second embodiment which is illustrated in FIG. 10, the communication device 16, in the same way as the first example of the first embodiment, sends the command acceleration which was calculated by the acceleration calculating part 14 of the first control part 41 to the position compensating value calculating part 15 and jerk calculating part 17 of the second control part 42. However, the acceleration calculating part 14 used need not be the one at the first control part 41. The acceleration calculating part 14 of the second control part 42 may also be used. In this case, like in the second example of the first embodiment, the acceleration calculating part 14 is positioned at the rear of the communication device 16.

Figure 13:
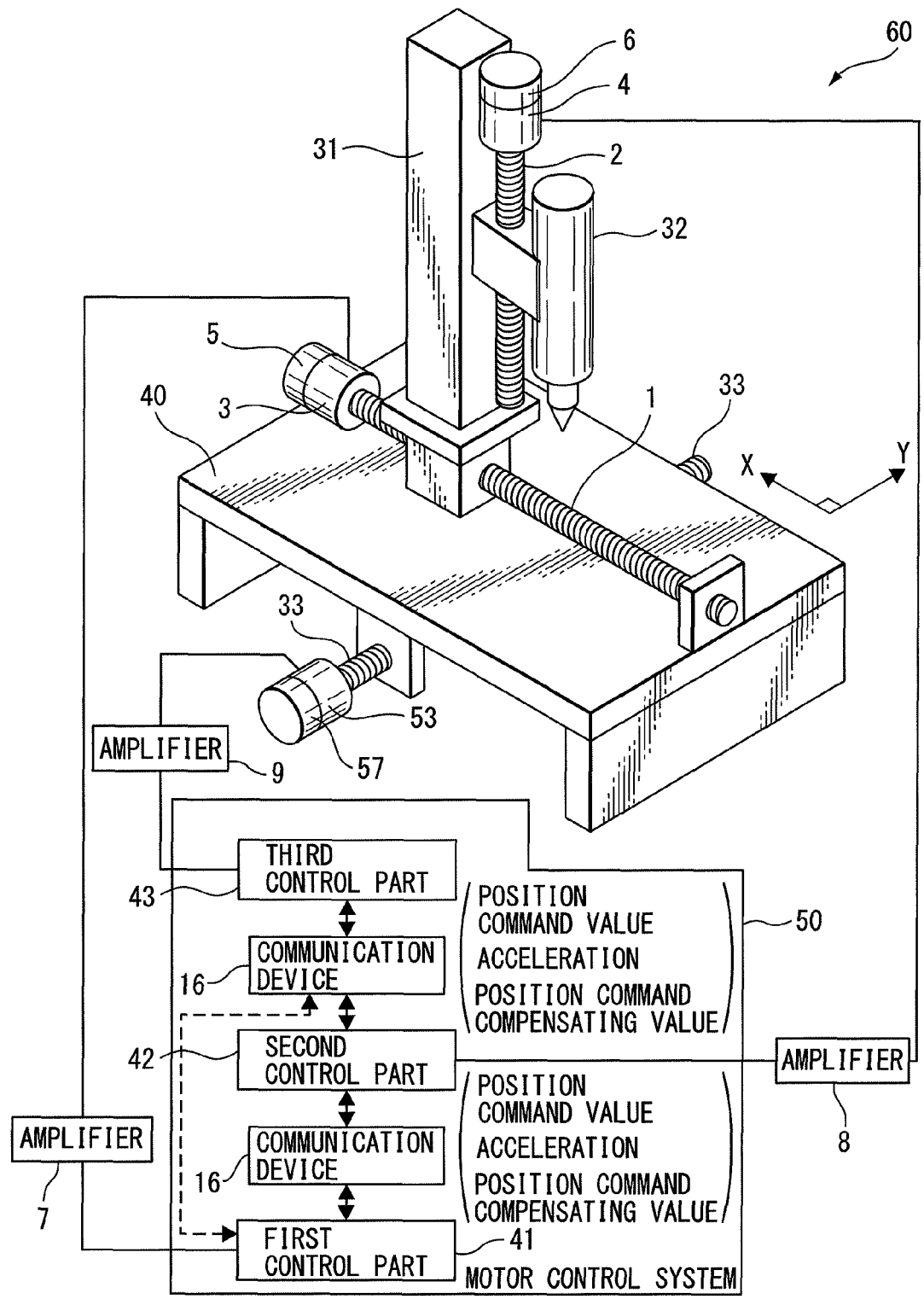
FIG. 13 is a view of a configuration which illustrates the basic configuration of a motor control system of a third embodiment of the present invention.

FIG. 13 is a view of the configuration which illustrates the basic configuration of a motor control system 50 of a third embodiment of the present invention. Compared with the motor control system 10 of the first embodiment which is illustrated in FIG. 3, the number of axes controlled is increased. That is, assume the machine tool 60 which is controlled by the motor control system 50 of the third embodiment is provided with three axes as positioned objects for positioning. Note that, to facilitate understanding of the explanation, in the machine tool 60 which is provided with the three axes, component members the same as the machine tool 30 which is provided with the two axes controlled by the motor control system 10 of the first embodiment which is illustrated in FIG. 3 will be assigned the same reference notations for explanation.

The machine tool 60 which is provided with three axes to be positioned by the motor control system 50 of the third embodiment is provided with a horizontal direction moving part 31 and vertical direction moving part 32 and with a moving table 40. The horizontal direction moving part 31 engages with the first axis 1 on the moving table 40. If the first axis 1 is driven to rotate by the first servo motor 3, the moving part moves on the moving table 40 in the horizontal direction, for example, the X-direction. Further, the vertical direction moving part 32 engages with the second axis 2. If the second axis 2 is driven to rotate by the second servo motor 4, the moving part moves along the longitudinal direction of the horizontal direction moving part 31 in the vertical direction.

At the moving table 40, a third axis 33 is engaged. If the third axis 33 is driven to rotate by the third servo motor 53, the moving table 40 moves in the Y-direction perpendicular to the X-direction. Usually, the first axis 1 and the third axis 33 are vertical. The first, second, and third servo motors 3, 4, and 53 respectively have rotary encoders 5, 6, and 57 attached to them.

Inside of the motor control system 50, a first control part 41, second control part 42, and third control part 43 which generate position command values for the first, second, and third servo motors 3, 4, and 53 and communication devices 16 which send and receive data between the first and second control parts 41 and 42 and between the second and third control parts 42 and 43 are provided. The communication devices 16 can send data both between the first and second control parts 41 and 42 and between the second and third control parts 42 and 43. Further, the communication devices 16, as illustrated by the path which is illustrated by the broken line, can send data between the first and third control parts 41 and 43.

Figure 14:
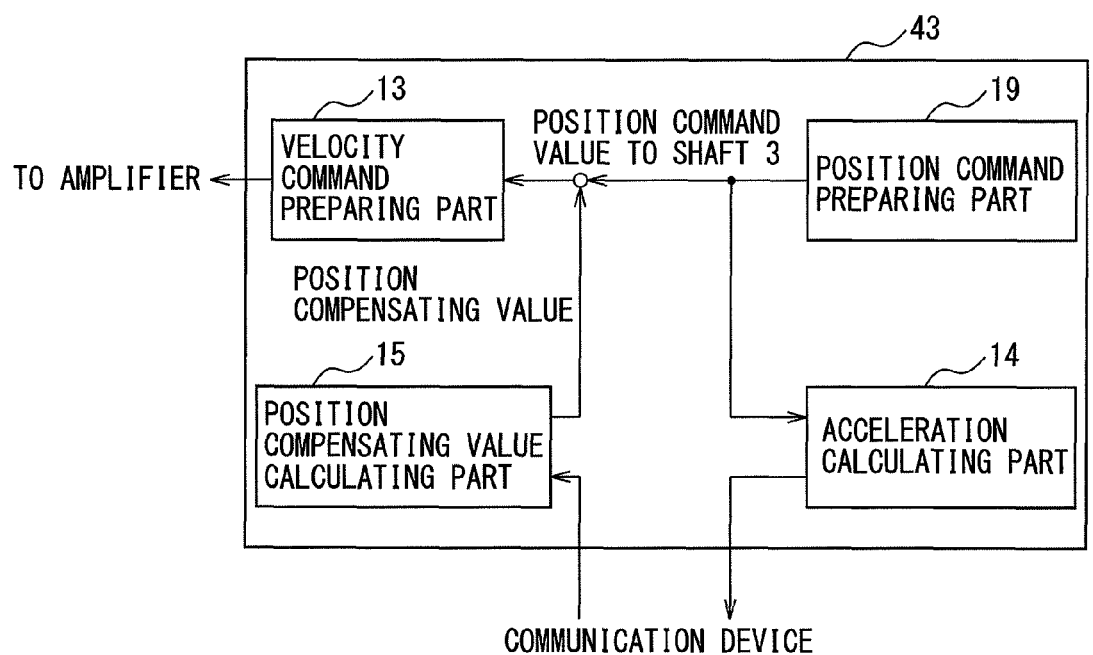
FIG. 14 is a block diagram which illustrates one example of the internal configuration of the third control part which is illustrated in FIG. 13.

The structures and operations of the first control part 41 and the second control part 42 in the motor control system 50 which is illustrated in FIG. 13 are the same as the structures which are explained in FIG. 12A and FIG. 12B. Further, the structure of the third control part 43 is as illustrated in FIG. 14. A velocity command preparing part 13, position compensating value calculating part 15, acceleration calculating part 14, and position command preparing part 19 are provided for driving the third servo motor. The acceleration calculating part 14 calculates the acceleration of the axis 3. Further, the position compensating value calculating part 15 calculates a position compensating value which compensates the position of the axis 3 when acceleration of the axis 1 or axis 2 is input. The position command preparing part 19 generates a position command value for the axis 3.

In the third embodiment, between the velocity command preparing parts 11, 12, and 13 and the first, second, and third servo motors 3, 4, and 53, respective amplifiers 7, 8, and 9 are provided. The amplifiers 7, 8, and 9 may also be provided at the inside of the motor control system 50. The individual velocity command preparing parts 11, 12, and 13 for driving the first, second, and third servo motors use position command values of the position command values from the position command preparing parts 19 to which the position compensating values which were calculated by the position compensating value calculating parts were added and position feedback values to prepare velocity command values. Since it is known art, illustration was omitted, but between the velocity command preparing parts and the amplifiers, usually there are a torque command preparing part which uses the velocity command value and the velocity feedback value to prepare a torque command value and a voltage command preparing part which uses the torque command value and the current feedback value to prepare a voltage command to be output to the amplifier. Due to the torque command preparing part and the voltage command preparing part, the servo motor is controlled to become a velocity which matches the velocity command value. Note that, the position feedback values are sent from rotary encoders 5, 6, and 57 at the first, second, and third servo motors 3, 4, and 53.

The transfer of data by the communication device 16 between the first control part 41 and the second control part 42 in the motor control system 50 which is illustrated in FIG. 13 can, for example, be performed by the configuration which is illustrated in FIG. 12A and FIG. 12B as explained in FIG. 4, so here the explanation will be omitted. On the other hand, the transfer of data between the second control part 42 and the third control part 43 can, for example, be performed by the configuration which is illustrated in FIG. 16 which is similar to the configuration which is illustrated in FIG. 4.

In the configuration which is illustrated in FIG. 15, the position compensating value calculating part 15 to which the acceleration of the third axis 33 is input multiplies the acceleration of the third axis 33 with the compensation gain to calculate the position compensating value and adds this to the position command value of the second axis 2 to compensate it. Further, in the motor control system 50 which is illustrated in FIG. 13, the communication device 16 sends a signal from the acceleration calculating part 14 which is illustrated in FIG. 15 to the position compensating value calculating part 15, but the position of the communication device 16 is not necessarily between the acceleration calculating part 14 and position compensating value calculating part 15. Examples in which the layouts of the acceleration calculating parts 14, position compensating value calculating parts 15, and communication device 16 were made different and several examples in which the methods of calculation of the acceleration by the acceleration calculating parts 14 were made different have already been explained, so here the explanations will be omitted and only the operation of the configuration of FIG. 15 will be explained.

FIG. 15 illustrates the configuration of an example in the case where the data which the communication device 16 sends is command acceleration and illustrates the processing between the second control part 42 and the third control part 43 of the motor control system 50 which is illustrated in FIG. 13. In the present embodiment, the processing for the axis 2 is performed by the second control part 42 inside of the motor control system 50, while the processing for the axis 33 is performed by the third control part 43. Note that, as illustrated in FIG. 14, the second control part 42 and the third control part 43 respectively have position command preparing parts 19, acceleration calculating parts 14, and position compensating value calculating parts 15, but illustration of non-operating members is omitted.

The processing for the axis 3 is performed by the velocity command preparing part 13 and acceleration calculating part 14 for driving the third servo motor at the third control part 43. The velocity command preparing part 13 for driving the third servo motor uses the position command value from the position command preparing part 19 which is illustrated in FIG. 14 and position feedback signal as the basis to calculate the velocity command value of the third axis. Since it is known art, illustration was omitted, but between the velocity command preparing part and amplifier 9, usually there are a torque command preparing part which uses the velocity command value and the velocity feedback value to prepare a torque command value and a voltage command preparing part which uses the torque command value and the current feedback value to prepare a voltage command to be output to the amplifier. Due to the torque command preparing part and the voltage command preparing part, the third servo motor 53 is controlled so as to become a velocity which matches the velocity command value. A position feedback signal is sent from the rotary encoder 57. Further, the acceleration calculating part 14 uses the position command value of the third axis 33 from the position command preparing part 19 as the basis to calculate the acceleration of the third axis and outputs this as the command acceleration to the communication device 16. Further, the communication device 16 sends the command acceleration which was input from the acceleration calculating part 14 to the position compensating value calculating part 15 at the second control part 42.

The second control part 42 uses the command acceleration which was input from the communication device 16 as the basis to perform the processing for the axis 2. The processing for the axis 2 is performed by the velocity command preparing part 12 and position compensating value calculating part 15 for driving the second servo motor. The position compensating value calculating part 15 calculates the position compensating value of the second axis 2. As illustrated in FIG. 13, if the third axis 33 is driven and the moving table 40 moves along the third axis 33 in the horizontal direction, the vertical direction moving part 32 receives the effect of the acceleration in the movement of the moving table 40 in the horizontal direction. The position compensating value calculating part 15 at the second control part 42 uses the command acceleration which was input from the acceleration calculating part 14 through the communication device 16 so as to calculate the position compensating value of the second axis 2. The position compensating value of the second axis 2 is calculated by the position compensating value calculating part 15 multiplying the command acceleration with the compensation gain. The compensation gain is a coefficient and a constant. By making the compensation gain a constant, the position compensating value (=compensation gain×acceleration) is proportional to the acceleration.

In the processing for the axis 2 in the second control part 42, the position compensating value which was calculated by the position compensating value calculating part 15 is added to the position command value from the position command preparing part 19 so that the position command value is compensated. The compensated position command value is input to the velocity command preparing part 12 for driving the second servo motor. The velocity command preparing part 12 uses the position command value which was compensated by the position compensating value as the basis to calculate the velocity command value of the second axis. Since it is known art, illustration was omitted, but from the velocity command preparing part to the amplifier 8, usually there are a torque command preparing part which uses the velocity command value and the velocity feedback value to prepare a torque command value and a voltage command preparing part which uses the torque command value and the current feedback value to prepare a voltage command to be output to the amplifier. Due to the torque command preparing part and voltage command preparing part, the second servo motor 4 is controlled to become a velocity which matches the velocity command value.

In the motor control system 50 of the third embodiment explained above, the processing for compensation of the interference between axes between the first control part 41 and the second control part 42 and the processing for compensation of the interference between axes between second first control part 42 and the third control part 43 in the communication path using the communication devices 16 and illustrated by the solid line were explained. On the other hand, the communication devices 16, as illustrated by the path which is illustrated by the broken line in FIG. 13, can transmit data between the first and third control parts 41 and 43, so the explanation is omitted, but in the motor control system 50 of the third embodiment, processing for compensation of interference between axes is also possible between the first control part 41 and the third control part 43.

Above, the present invention was explained in relation to its preferred embodiments, but a person skilled in the art would understand that various compensations and changes can be made without departing from the scope of disclosure of the following claims.

What is claimed is:

1. A motor control system which controls axes in an environment in which axes which are driven by motors are provided and in which when at least one axis is driven, at least one axis which is not driven is interfered due to the driven axis, in which motor control system, wherein the driven axis is defined to be an interference generating axis and the axis which is not driven is defined to be an interference receiving axis, comprising
control parts which control movement of the axes for each of said axes, and
a communication device which sends and receives data between said control parts, wherein
each said control part is provided with
a position command preparing part which prepares a position command value for an axis being driven,
a position detector which detects a position of the axis,
a velocity command preparing part which uses said position command value from said position command preparing part and a position feedback signal from said position detector to prepare a velocity command value,
an acceleration calculating part which calculates an acceleration of the axis being driven, by using one of the position command values of the axis being driven and the position feedback signal of the axis being driven, and
a position compensating value calculating part which calculates a position compensating value which compensates a position command value of the axis being driven when acceleration of said interference generating axis is input from the communication device,
said communication device sends an acceleration which was calculated by said acceleration calculating part to said other control part,
said position compensating value calculating part calculates said position compensating value by multiplying the acceleration of said interference generating axis with a compensation gain and
said velocity command preparing part compensates said position command value by adding said position compensating value from said position compensating value calculating part on position command value from said position command preparing part to said axis being driven.

2. The motor control system according to claim 1, wherein said communication device informs the acceleration of the interference generating axis which is output from said acceleration calculating parts provided at each of said control parts to said position compensating value calculating part provided at said control part which does not include said interference generating axis.

3. The motor control system according to claim 2, wherein
each axis is provided with an acceleration detector which
   measures acceleration of said each axis, and
said acceleration calculating part outputs a measurement
   value from said acceleration detector, instead of outputting one of position command value of said axis
   being driven and position feedback signal of said axis
   being driven.

4. The motor control system according to claim 1, wherein
each said control part further comprises a jerk calculating
   part which uses an acceleration which was calculated
   by said acceleration calculating part to calculate a jerk
   and a velocity compensating value calculating part
   which uses a jerk which was calculated by said jerk
   calculating part to calculate a velocity compensating
   value which compensates a velocity command value
   and adds it to said velocity command value, and
said velocity compensating value calculating part calculates said velocity compensating value by multiplying
   said jerk with a compensation gain.

* * * * *